Dec. 29, 1925.
P. MAGNI
1,567,531
VARIABLE FLUIDO-DYNAMIC WINGS SUCH AS FOR AEROPLANES
Filed March 24, 1923      6 Sheets-Sheet 1
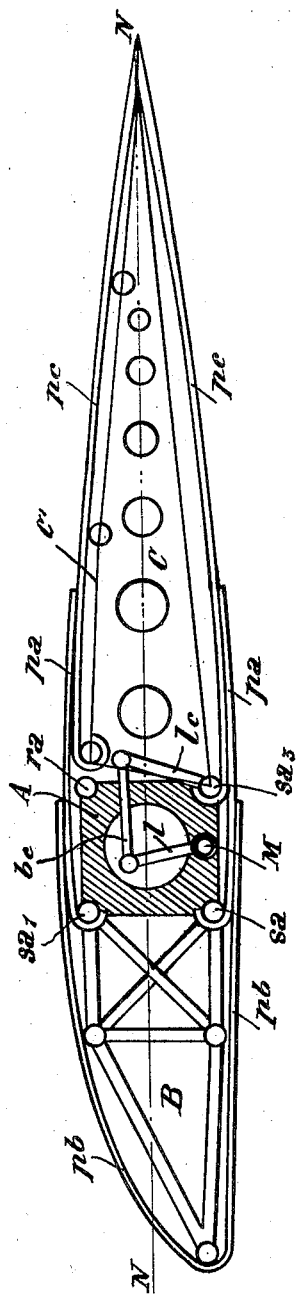
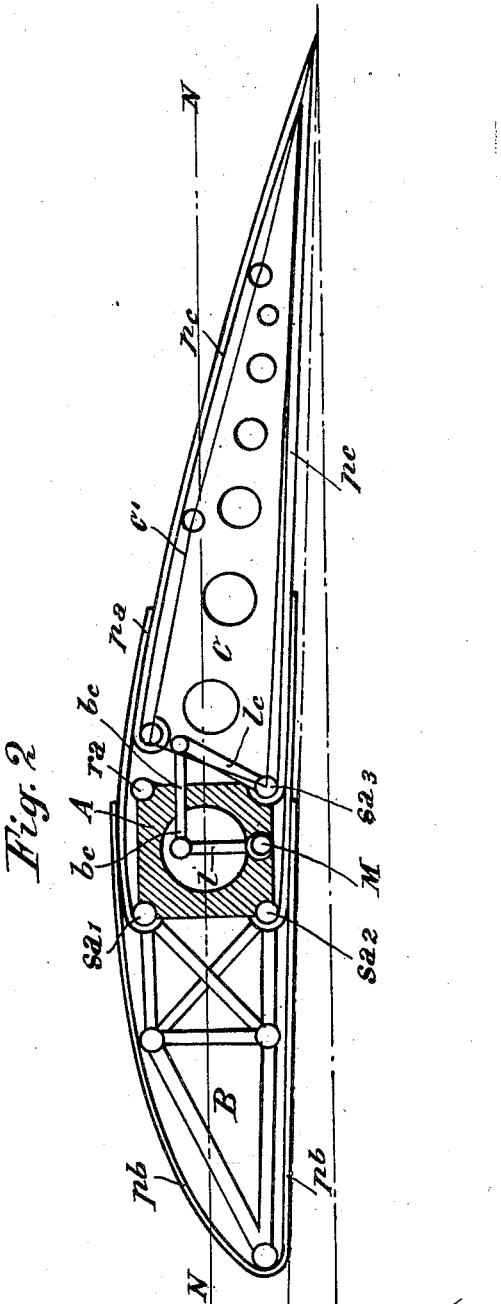
Inventor:
P. Magni

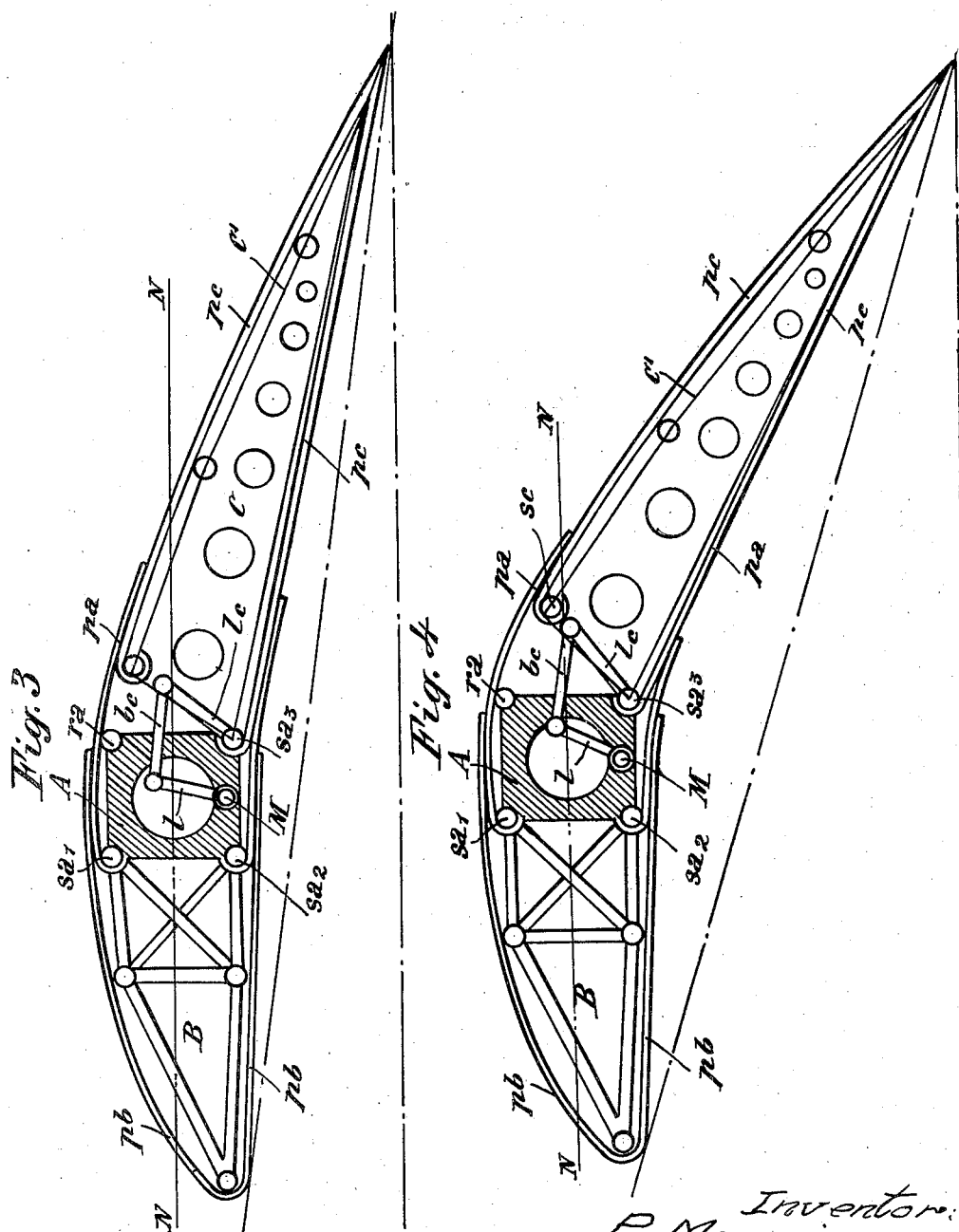

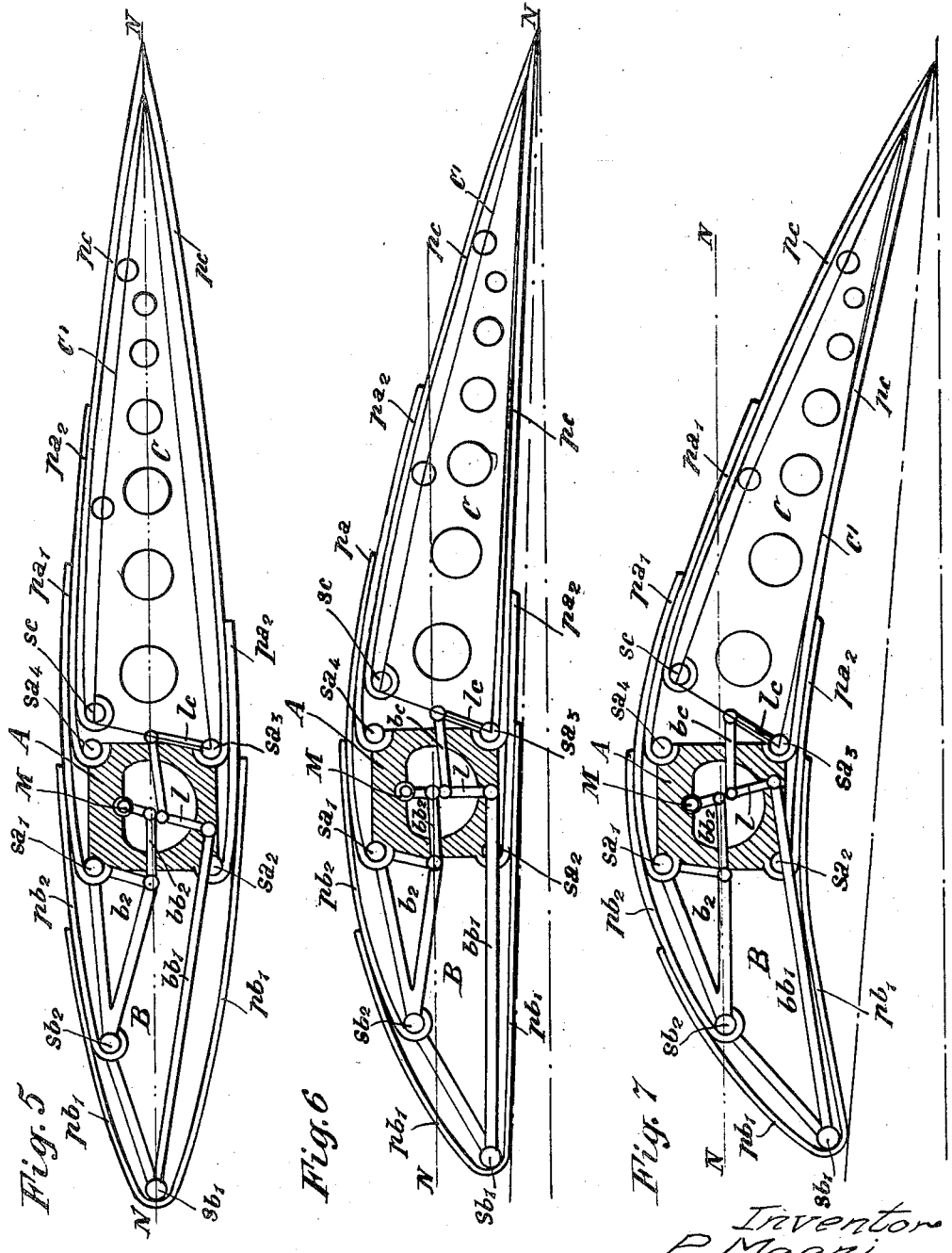

Dec. 29, 1925. 1,567,531
P. MAGNI
VARIABLE FLUIDO-DYNAMIC WINGS SUCH AS FOR AEROPLANES
Filed March 24, 1923 6 Sheets-Sheet 4
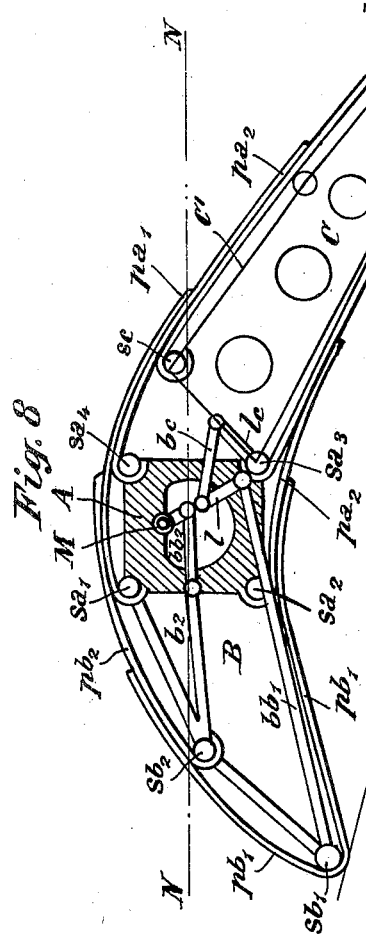
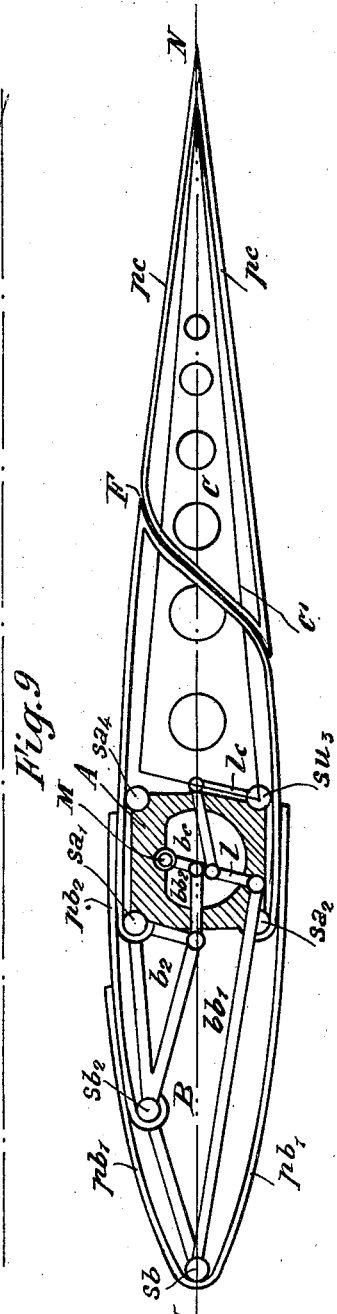
Inventor:
P. Magni

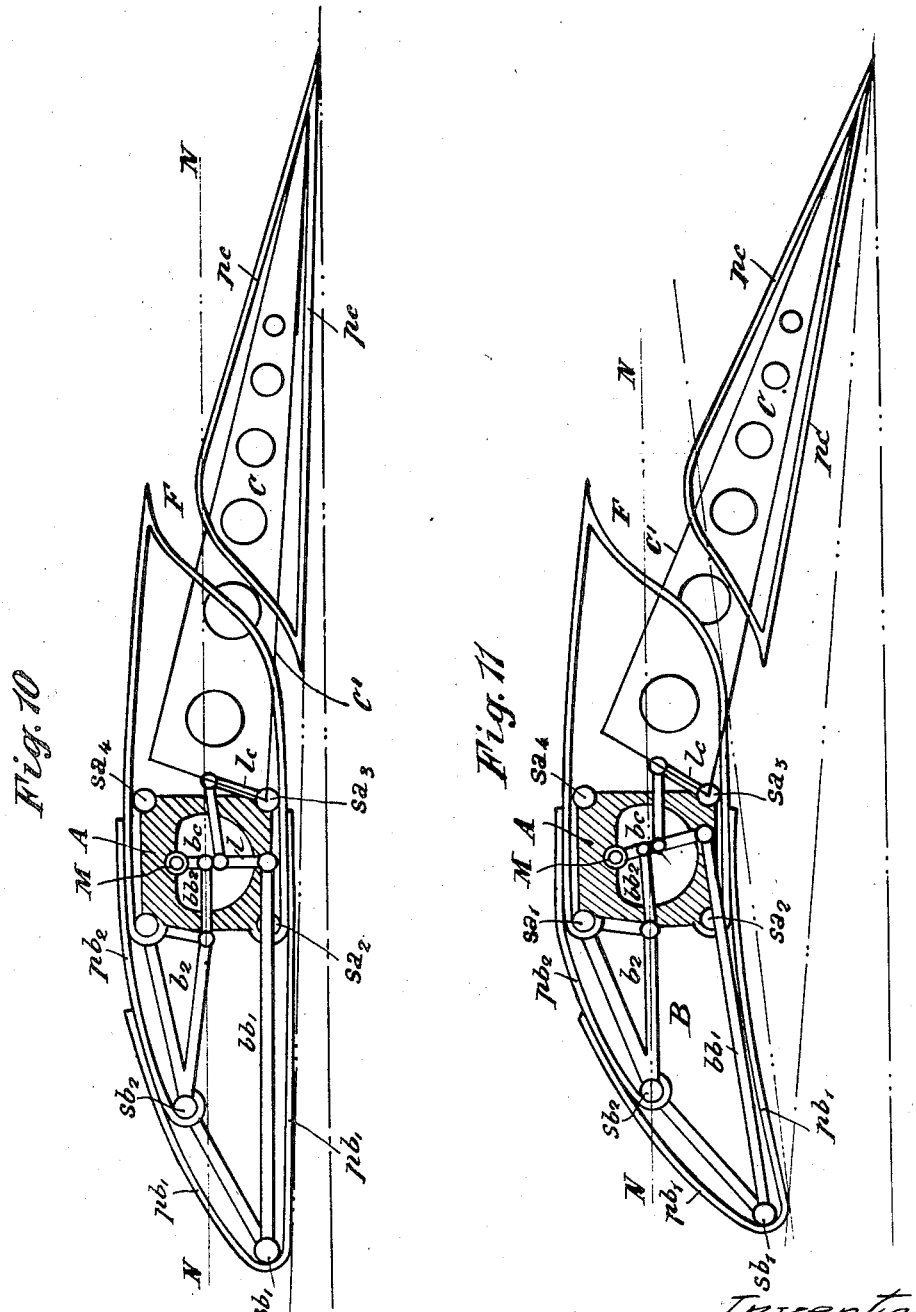

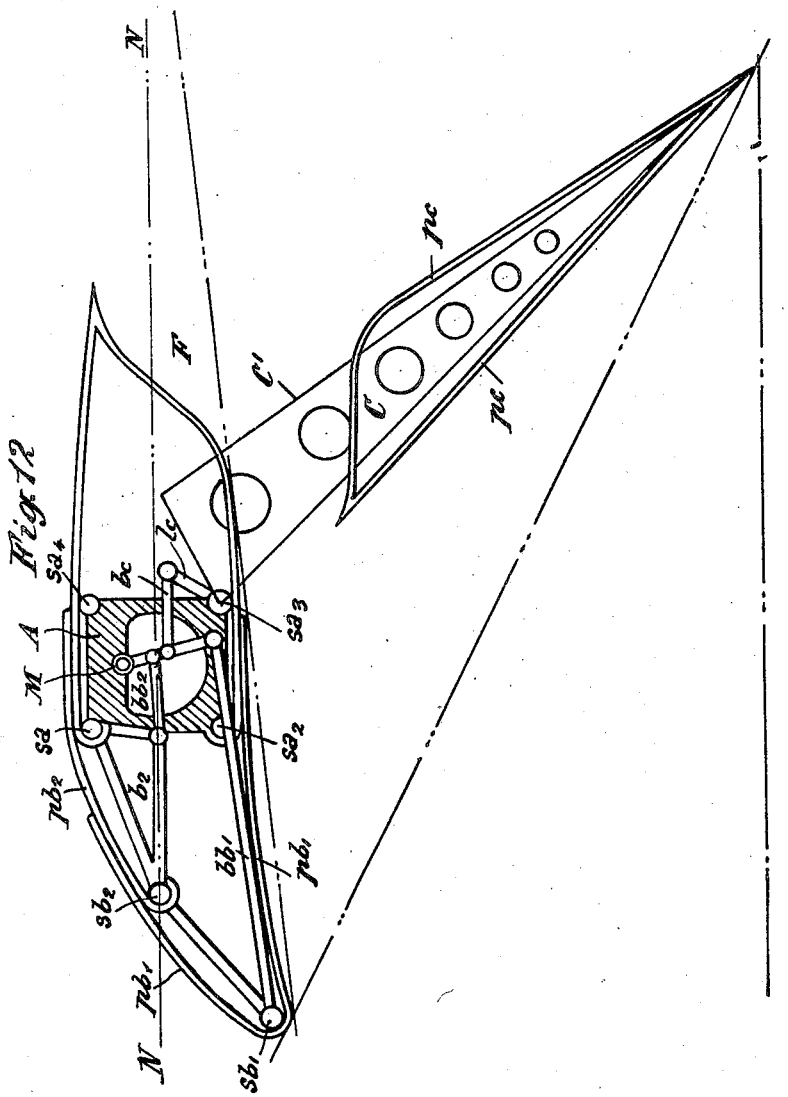

Patented Dec. 29, 1925.

1,567,531

UNITED STATES PATENT OFFICE.

PIERO MAGNI, OF GENOA, ITALY.

VARIABLE FLUIDO-DYNAMIC WINGS SUCH AS FOR AEROPLANES.

Application filed March 24, 1923. Serial No. 627,462.

*To all whom it may concern:*

Be it known that I, PIERO MAGNI, a subject of the King of Italy, and residing at Genoa, Italy (whose post-office address is 57 Piazza di Negro, Genoa, Italy, have invented certain new and useful Improvements in or Relating to Variable Fluido-Dynamic Wings such as for Aeroplanes, of which the following is a specification.

This invention relates to variable fluido-dynamic wings, such as for aeroplanes, and has for its object to provide means for varying at will the profile or shape of wings by suitable controlling devices, thus varying the operating capacity, and adaptability of aircraft to all conditions between highest and lowest speed so that the machine will have its highest supporting efficiency and lowest resistance to air under any condition.

These ends are obtained according to my present invention by the dorsal and ventral faces of wings being wholly or partially composed of overlapping elastic or elastically mounted plates capable of sliding upon each other so as to vary the profile and shape of wings at the will of the pilot by means of suitable controlling devices, the wings substantially consisting in centrally fixed and peripherically movable frames operated by a system of pivoted levers and their auxiliary devices, the outline of wings always remaining smooth and continuous.

In order that my said invention may be more clearly understood I have illustrated same by way of example as used in connection with aeroplanes in the annexed drawings in which:

Figs. 1–4 are sectional views of an aircraft wing with partially deformable profile in four different positions with relation to a line N N and Figs. 5–8 sectional views of an aircraft wing with totally deformable profile shown at four angles of inclination to line N N, whilst Figs. 9–12 are sectional views of an aircraft wing with partially independently movable tail member shown at four different angles of inclination to line N N.

In Figs. 1–4, A is the fixed or central part of wing comprising walls or plates $pa$ $pa$ mounted on pivots $sa^1$ $sa^2$. B is the fore part comprising walls or plates $pb$ $pb$, and C the movable back part or tail member swinging on hinge $sa^3$ mounted on bottom end of fixed part A (which may be f. i. the cross beam), the said tail member C being controlled by rotating the shaft M so as to swing the lever $l$ and, by means of connecting link $bc$, also the lever $lc$ and thereby the tail member C. $pa$ are the elastic or elastically mounted dorsal and ventral, that means top and bottom plates of central part of wing, rotating on pivots $sa^1$, $sa^2$ and $ra$ and capable of sliding on plates $pc$ $pc$ of tail member C, so as to shorten or lengthen the dorsal and ventral line of profile of wing without interrupting or altering the smooth continuous outline of same.

Figs. 5–8 illustrate, as has been said, a totally deformable wing, comprising fixed central section or member A mounted on a fixed part (such as cross beam), a movable and deformable fore member B, and a movable back or tail member C, the profile of wing being controlled by rotating the shaft M and thus swinging the lever $l$.

This movement is transmitted through connecting rods $bb^1$ and $bb^2$ to rollers $sb^1$ and $sb^2$ which thus shift plates $pb^1$ and $pb^2$, and through connecting rod $bc$ to tail member C which is being shifted and also shifts plates $pc$. In this manner the flexible and elastic plates $pb^1$ and $pb^2$ $pa^1$ $pa^2$ pivoted to $sa^3$, and $sa^4$ and $sc$ slide upon each other and on plates $pc$ pivoted to $sa^2$ $sa^4$ thereby varying the shape of the wing and the length of dorsal and ventral lines of wing without interrupting their continuity.

Figs. 9–12 show a modification in which the tail member C is independently movable on support plate $C^1$ pivoted to $sa^3$ so as to be capable of moving beyond the general curve of wing obtained by rotating the shaft M, up to an orthogonal angle to the air current so as to act as a brake, the support plate $C^1$ being connected to the wing controlling levers by separate levers, not shown. As tail member C is lowered as its angle of inclination increased, an increasing air passage F is formed giving passage to an air current which keeps up stability during braking, having a similar action as the air valve at the top of ordinary parachutes.

It is obvious that the above described principle of invention is adaptable to analogous wing like members working in other fluids than air. such as water.

Having now particularly described and ascertained the nature of my said invention and in what manner the same is to be performed I declare that what I claim is:

1. An aeroplane wing including upper and lower overlapping plates forming the entire dorsal and ventral surfaces of the wing and capable of sliding upon each other for shortening or lengthening the dorsal or ventral surfaces to vary the camber of the latter without interrupting their smooth continuous outline, means associated with said plates for varying the profile of said surfaces at all points from edge to edge of the wing, a tail section movable independently of the remainder of the wing and provided with a supporting plate, and separate levers for controlling the supporting plate to permit the tail section to be moved into a position at right angles to the fluid current so as to brake the wing, said tail section being so mounted as to move away from the body of the wing to form a fluid passageway increasing in area as the inclination of the tail section varies relatively to the body of the wing.

2. An aeroplane wing including a body section and a tail section, said body section being provided with dorsal and ventral overlapping plates capable of sliding on each other without interrupting the continuity of such surfaces, means within the plates for varying the dorsal and ventral surfaces by adjusting said plates, and means pivotally connecting the tail section to the body section, said means being pivotally mounted and causing the tail section to move away from the body section when the tail section is moved downwardly at an angle relatively to the body section, so as to form an opening between the two sections which will increase in area as the tail section moves downwardly relatively to the body section.

In testimony whereof I have hereunto signed my name.

PIERO MAGNI.